Figure 2:
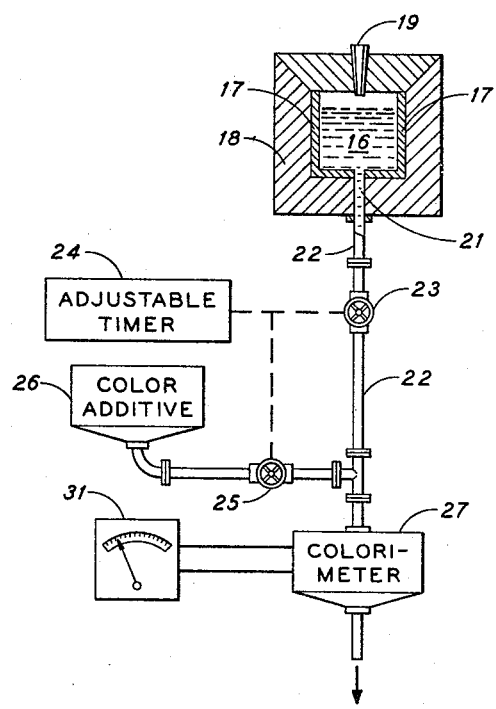

Nov. 22, 1966     D. O. SEEVERS     3,287,088
ANALYZING DRILLING FLUID FOR AROMATIC HYDROCARBONS
Filed Sept. 24, 1956     2 Sheets-Sheet 1

INVENTOR
DELMAR O. SEEVERS
BY
ATTORNEYS

United States Patent Office 3,287,088
Patented Nov. 22, 1966

3,287,088
ANALYZING DRILLING FLUID FOR
AROMATIC HYDROCARBONS
Delmar O. Seevers, Fullerton, Calif., assignor to Chevron Research Company, a corporation of Delaware
Filed Sept. 24, 1956, Ser. No. 611,708
2 Claims. (Cl. 23—230)

This invention relates to methods of analyzing waters for the presence of selected hydrocarbons and has particular application to the analysis of waters from the earth in prospecting for subterranean petroleum deposits.

There are numerous applications where it is desired to measure the concentrations of trace amounts of hydrocarbons in water. One of such applications, and the one to which the present invention is particularly although not exclusively directed, is the measurement of the concentration of aromatic hydrocarbons in waters from the earth. In exploring for underground petroleum accumulation, the presence of selected hydrocarbons in earth waters, either free water in the earth or water removed from drilling fluids utilized in drilling exploratory wells, is utilized as an indication of the possible presence of petroleum accumulations. Heretofore, the measurement of the concentrations of these hydrocarbons in the waters has been a very exacting and time-consuming operation, since the selected hydrocarbons are usually present in such small concentrations that conventional analysis techniques, such as solvent extraction and distillation, are unsuitable.

Broadly, the present invention comprises an analysis technique in which the water suspected of containing liquid hydrocarbons is subjected to irradiation by ionizing radiation. Such ionizing radiation may be in the form of electromagnetic radiation, such as ultraviolet rays, X-rays, or gamma rays, or in the form of ionizing particles such as beta rays or alpha particles. The irradiation is carried out for a predeterminable length of time sufficient to convert at least a portion of the hydrocarbons present in the water to a phenolic compound. The water samples are irradiated for a predeterminable length of time, based on the knowledge of the source strength and source geometry, to produce a predeterminable radiation dose. The irradiated water is then examined or analyzed to obtain a measure of the concentration therein of the phenolic compound.

The present analysis technique apparently is effective for all compounds containing aromatic rings, so that it is applicable to heavy as well as to light aromatics and to nonhydrocarbon organic compounds that contain benzene rings. The mechanism involved in the hydroxylation of benzene or other aromatics upon irradiation of its aqueous solution with X-rays or gamma rays is believed to be:

$$H_2O \leadsto H + OH$$

The hydroxyl radical freed by the irradiation then combines with the aromatic molecules to form a phenolic compound. In the case of irradiation of a dilute aqueous solution of benzene, in addition to the primary reaction of the formation of phenol, additional reactions in the form of the production of hydrogen, hydrogen peroxide, diphenyl and terphenyl may occur. The irradiation of an aqueous solution of toluene results in the formation of cresols, and the irradiation and hydroxylation of xylene results in the formation of xylenols.

For a given radiation dose the yield of phenolic compounds will be a function of the original concentration in the water sample of the substance containing one or more aromatic rings, so that an analysis of the water for the concentration therein of phenolic compounds produces a measure of the concentration of the aromatic-containing substances in the water. The analysis of the irradiated water for the concentration therein of phenolic compounds may be carried out by any suitable known means, but preferably a colorimetric method is used to provide an accurate and rapid analysis method.

After collection of the water samples, the sample or portions thereof are exposed to the selected electromagnetic radiation, for example, gamma rays from $Co^{60}$, for a predeterminable length of time. The efficiency of conversion of the aromatic-containing compounds to phenolic compounds is affected by the quantity of oxygen available to the reaction. For example, when using Cobalt 60, if no oxygen is present in the reaction, the percentage conversion to phenolic compounds is about 5%. If the water is permitted to come to equilibrium with air, the efficiency of the conversion is approximately 35%. Further, if air or oxygen is bubbled through the water during the radiation, the efficiency of conversion can be increased above the 35% figure for equilibrium with air, but the exact amount of the increased conversion efficiency cannot be determined with certainty and may vary during the irradiation. Therefore, preferably, the irradiation is carried on with the water sample at equilibrium with air to produce a predictable and substantially constant conversion efficiency of approximately 35%.

The exact radiation dose to be given a given water sample will depend upon the concentrations sought, but the following general considerations will apply in all cases. Assuming that the reaction operates at a conversion efficiency of 35%, it requires approximately 1 kiloroentgen of radiation to convert to a phenolic compound, aromatic-containing compounds having a concentration in the water of 300 parts per billion (p.p.b.). With 35% conversion efficiency, this concentration of 300 p.p.b. of the aromatic-containing substances will be converted by a dose of 1 kiloroentgen into approximately 105 p.p.b. of phenolic compound in the irradiated water. As is well known in the art, the dose rate in kiloroentgens per hour will be a function both of the source strength and energy and the geometry of the relation of the source to the irradiated water. Utilizing calculations well known in the art, the dose rate in kiloroentgens per hour resulting from any given source strength and source-irradiated object geometry may be determined Then, knowing the dose rate in kiloroentgens per hour, the variable involved, time, can be adjusted to produce the desired total dose.

After irradiation of a predetermined dose, the irradiated water is removed from exposure to the source of radiation and analyzed in some suitable manner for the concentration of phenolic compounds. Preferably a colorimetric method of analysis is utilized to determine the phenol concentration, and such method may be any of those well known in the analysis art, such as the Folin-Denis method or the 4-aminoantipyrine method. These analysis methods involve the addition to the analyzed water of a color reagent, and the analysis of the mixture of water and color reagent by a spectrophotometer or filterphotometer to measure absorption, by the mixture, of light of a predetermined frequency.

Figure 1:
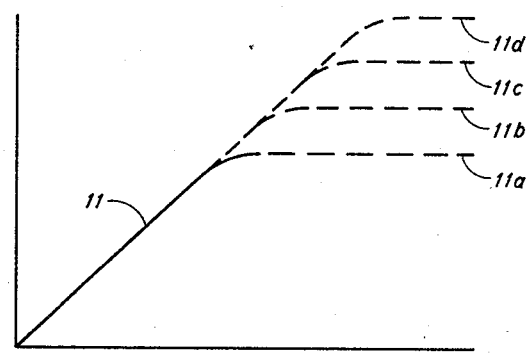
Figure 3:
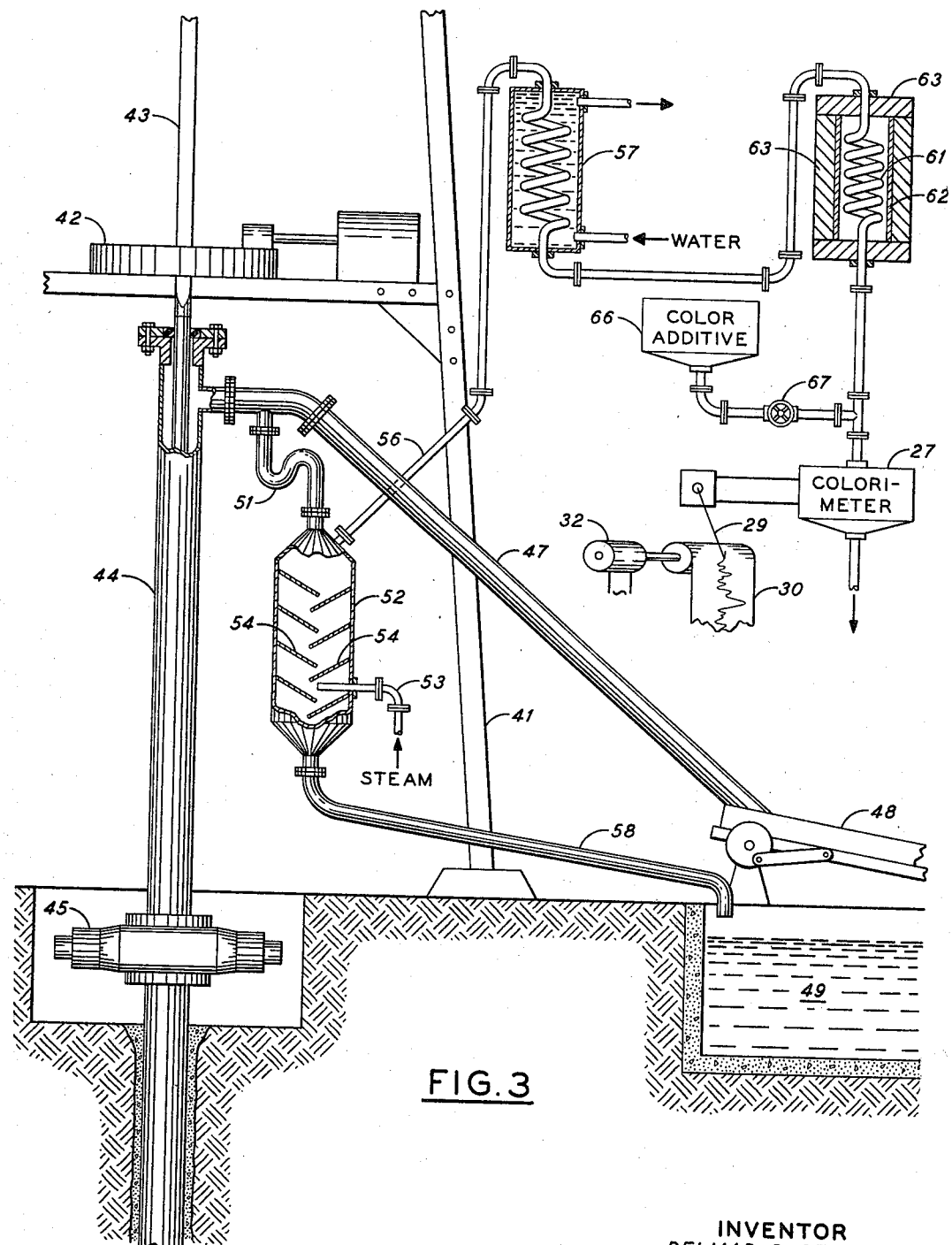

The operation of the present invention will be more apparent from the following description when read in connection with the accompanying drawings, in which:

FIG. 1 is a curve illustrating the relationships involved in the irradiation of water having aromatic-containing substances therein;

FIG. 2 diagrammatically illustrates apparatus for carrying out the method of the present invention; and FIG. 3 diagrammatically illustrates apparatus for carrying out the present invention in connection with the analysis on a continuous basis of drilling fluids for the presence therein of aromatic hydrocarbons.

In Fig. 1, curve 11a represents the relationship between the aromatic concentration in water, plotted on the axis of abscissa in units of parts per million, and the yield of phenolic compound, plotted on the ordinate axis, in units of parts per million, for water irradiated with a particular dose of X-rays or gamma rays. It will be seen that curve 11a is substantially linear over a considerable portion starting at the origin and extending up to the knee of the curve. After the knee of the curve is passed, the phenolic yield remains substantially constant for increasing aromatic concentrations. It is this substantially linear portion of the curve which is utilized in the present invention to produce a proportionality between the aromatic concentration in the water and the concentration of phenolic compounds therein after radiation of the water at a predetermined dose. Curve 11a applies for only one particular radiation dose, but the effect of variations in this dose will be to vary the point at which the knee occurs, so that a family of additional curves 11b, 11c, 11d results for different doses, each of these curves having a substantially linear portion on which to operate.

FIG. 2 illustrates apparatus for carrying out the method of the present invention in one form. In FIG. 2 reference character 16 designates a sample-receiving chamber adapted to hold the water to be irradiated. The sample placed in chamber 16 may be in a container, although in Fig. 1 it is assumed that the water to be irradiated is put directly into sample chamber 16. Sample chamber 16 is surrounded by a substance 17 capable of emitting radiation, such as a lining of cobalt 60 or some other suitable source of gamma rays. Source 17 in turn is surrounded by shielding 18 to confine the radiation. The enclosure formed by shielding 18 is provided with an opening 19 in the top thereof for permitting access to sample chamber 16. The bottom of shielding 18 is provided with an opening 21 extending through the shielding and radioactive substance 17 to permit draining of the contents of sample chamber 16. Opening 21 communicates with a pipe 22 having a valve 23 therein. Valve 23 is operated by an adjustable timing mechanism shown schematically at 24 for automatically opening and closing valve 23 to release the contents of sample chamber 16 after a predetermined period of radiation from source 17. After irradiation, the irradiated water is analyzed for the concentration of phenolic compounds therein. As stated above, this analysis for the phenol concentration in the irradiated water may be carried out utilizing any suitable well known analysis method such as the Folin-Denis reagent test or the 4-aminoantipyrine method. The Folin-Denis test, which is described fully in Colorimetric Methods of Analysis, vol. II, F. D. Snell, involves the addition to the irradiated water of a phenol reagent, and the analysis, after a suitable reaction period, of the solution by colorimetric methods to determine the absorption of light by the solution. The absorption of light of a predetermined frequency by the solution under study may be compared with the absorption of light of that frequency by a standard phenol solution and an indication obtained therefrom as to phenol concentration in the studied solution.

As an alternate method of phenol determination, the 4-aminoantipyrine method may be utilized. This method is described fully in Standard Methods for the Examination of Water, Sewage and Industrial Wastes, 10th ed., 1955, American Public Health Association, pages 335–340. Briefly, this method comprises the steps of the addition to the irradiated water of suitable reagents and the analysis of the solution by colorimetric methods to determine the absorption of light of a predetermined frequency. The absorption of light of a predetermined frequency by the solution under study may be compared with the absorption of light of that frequency by a standard phenol solution and an indication obtained therefrom as to phenol concentration in the studied solution.

Assuming that one of the above analysis methods is utilized, conduit 22 may continue below valve 23 to a T connection communicating through a valve 25 with a source 26 of color additive or color reagent. Valve 25 may also be under the control of timer mechanism 24 to open valve 25 simultaneously with the opening of valve 23 to permit the addition to the irradiated water flowing in conduit 22 of the color additive to be used in the colorimetric analysis. The mixture of irradiated water and color additive then flows to a suitable colorimeter 27 which, as indicated above, may include a spectrophotometer or filterphotometer for measuring the absorption of light in the solution of irradiated water and color reagent. An electrical output signal from colorimeter 27 is supplied to a suitable recorder which may be in the form of a recording meter 31, for producing a record of the concentration of phenolic compounds in the analyzed water. The record produced by recorder 31 may be in terms of the phenol concentration itself, in which case this phenol concentration is correlated through a suitable table or graph to provide an indication of the corresponding aromatic concentration in the irradiated water. Alternatively, this correlation may be incorporated in the recorder 31 so that the record produced by recorder 31 is directly in terms of the aromatic concentration in the irradiated water.

The above-described embodiment illustrated in FIG. 2 is utilized in the automatic irradiation and analysis of the irradiated water, but it will be apparent that the method of the present invention may be carried out in numerous other ways. For example, one form of practicing the present invention which I have found particularly useful in the analysis of water samples having an indeterminate concentration of aromatics therein is as follows: A portion of the water sample is irradiated in suitable apparatus at a predetermined dose calculated to produce a linear operation over a predetermined range of aromatic concentrations, corresponding to the linear portion of curve 11 of FIG. 1. Assuming that for this particular radiation dose the operation is linear for aromatic concentrations from 0.1 p.p.m. to 1.0 p.p.m., then, if upon colorimetric analysis of the irradiated water the phenol yield therefrom is on the linear portion of the curve, the aromatic concentration in the sampled water may be read directly. If the phenol yield from the irradiated water is so high as to indicate an indeterminate aromatic concentration above the knee of the curve, another portion of the sample of water may be diluted with pure water to dilute the sampled water by, say, a factor of 10. This diluted sample may then be irradiated at the same dose, and a colorimetric analysis performed thereon to determine the phenolic concentration. If the phenolic concentration then has a value which falls on a linear portion of the curve, the aromatic concentration from the sampled water may be read from the curve, taking into account the dilution of the original water sample and accordingly changing the scale on the curve by a factor of 10.

If the phenolic yield is still above the knee of the curve, an additional dilution of an additional portion of the water sample may be performed to produce a dilution by a factor of, say, 100. Irradiation and colorimetric analysis may then be performed, and this procedure repeated until a value of phenolic yield is obtained which falls within the linear portion of the curve.

The sensitivity of the present method is a function both of the sensitivity of the colorimetric analysis method and of the concentration of the aromatic substance in the water. The sensitivity of the standard 4-aminoantipyrine test is about 1 part per million, and this sensitivity can be increased by suitable known color concentration techniques to at least 10 parts per billion. The concentration of the aromatic substances in the water can be increased by suitable techniques, such as by distillation, to further increase the over-all sensitivity of the analysis technique. Thus, in the embodiment illustrated in FIG. 2, if the aromatic concentration in the original sample is very low, a simple distillation process may be utilized prior to irradiation to increase this concentration by at least a factor of 10. Then, utilizing color concentration techniques in connection with the 4-aminoantipyrine method, the over-all sensitivity of the method will be at least one part in one billion.

FIG. 3 diagrammatically and schematically illustrates the operation of the present invention in connection with the analysis of water absorbed in a drilling fluid in the drilling of an exploratory well. In FIG. 3, reference character 41 designates generally a derrick for supporting a drilling rig which includes a rotary table 42 driving a length of drill pipe 43. A length of casing 44 surrounds drill pipe 43 between the ground and the floor of the drilling rig and is provided with a normally open blowout preventer 45 at approximately the surface of the ground. As is well known in the art, drilling fluid is circulated downwardly through drill pipe 43, through openings in the drilling bit and back up the annulus between the drill pipe and the hole wall or casing to lubricate the bit, to maintain pressure on the drilled formations and to carry cuttings to the surface.

In the embodiment illustrated in FIG. 3, the drilling mud flows through the annulus between drill pipe 43 and casing 44 and out through a conduit 47 to a suitable screening device 48, such as a shale shaker, where the larger pieces are screened from the drilling fluid and the remaining fluid is returned to a mud sump 49. A portion of this returning drilling fluid is withdrawn and analyzed in accordance with the method of the present invention to determine the concentration of aromatics. Such withdrawal may be through a conduit 51 connected to conduit 47 and leading to a suitable separator 52. The separator may be, as shown, a steam distillation device in which steam, entering through a conduit 53, is bubbled through the drilling fluid in a series of baffle plates 54 to extract the more volatile constituents. These more volatile constituents are drawn off from separator 52 at the top thereof through a conduit 56 leading to a condenser 57. The portion of the withdrawn drilling fluid which passes downwardly through separator 52 is returned to mud sump 49 through a conduit 58.

As shown in the drawing, condenser 57 utilizes a cooling medium, such as water, which is circulated past the coils carrying the withdrawn fluid to condense the fluid to a liquid. The condensed liquid from condenser 57 is exposed to radiation of a predetermined dose in a suitable device. In the illustrated embodiment, the condensed liquid passes through a coil 61 surrounded by a radioactive material 62 forming a source of gamma rays or X-rays. Source 62 is, in turn, surrounded by suitable shielding material 63. The condensed liquid is thus exposed to gamma ray or X-ray radiation for a predetermined length of time in traversing coil 61, to convert all or a portion of the aromatics therein to phenolic compounds. Since the strength of source 62 is known, the total dose may be closely regulated by regulating the rate of flow of the condensed liquid through coil 61.

The irradiated liquid from coil 61 then has added thereto a suitable color reagent from a source 66 through a valve 67. The mixture of irradiated liquid and color reagent then passes to colorimeter 27 where the colorimetric analysis is performed, in a manner similar to that described above, and the results thereof indicated by a pen 29 on a record strip 30 driven by a motor 32. As mentioned above, the record on record strip 30 may be in terms of phenol concentration, from which the aromatic concentration may be determined by suitable correlation, or alternatively, this correlation may be incorporated in the scale of record 30 and in the other elements of the recorder, so that record strip 30 reads directly in terms of aromatic concentration.

Although but a few embodiments of the present invention have been described, it will be apparent to those skilled in the art that various changes and modifications may be made therein without departing from the spirit of the invention or the scope of the appended claims. In particular, although the invention has been illustrated and described in connection with the analysis of water samples in prospecting for petroleum, it will be apparent that the method of this invention will be equally useful in other applications where it is desired to accurately determine the concentrations of aromatic hydrocarbons in water.

I claim:

1. The method of continuously recording the presence of aromatics in water absorbed in a drilling fluid during the drilling of a well bore comprising the steps of subjecting a portion of said drilling fluid returning to the earth's surface to agitation in the presence of steam to extract the more volatile constituents therefrom, separating said steam containing said volatile constituents from said drilling fluid, condensing said steam to a liquid containing said volatile constituents, subjecting a continuous stream of said liquid to at least one kiloroentgen of ionizing radiation of a predetermined dose to convert at least a portion of the aromatics therein to phenolic compounds, colorimetrically detecting said irradiated water to establish the concentration therein of said phenolic compounds, and recording the detected color changes in accordance with the depth in said well bore where said aromatics in water are absorbed into said drilling fluid.

2. The method of continuously analyzing drilling fluid used in drilling a well for the presence of aromatic hydrocarbons comprising the steps of diverting a portion of the circulating drilling fluid through a separator, passing steam through said drilling fluid in said separator to draw off the volatile constituents from said drilling fluid, removing said steam with said volatile constituents from said separator to a condensing chamber wherein steam is condensed to a liquid, flowing said liquid into a radiation chamber where said liquid is subjected to at least one kiloroentgen of ionizing radiation, flowing said liquid through a color additive device wherein a reagent is added to said liquid, said reagent being activated by phenolic compounds, and colorimetrically examining said liquid for the presence of phenolic compounds.

References Cited by the Examiner

UNITED STATES PATENTS

| 2,591,737 | 4/1952 | Souther | 250—71 |
| 2,744,199 | 5/1956 | Juterbock et al. | 250—43.5 |
| 2,755,388 | 7/1956 | Weisz | 250—43.5 |
| 2,757,076 | 7/1956 | Deprez et al. | 250—43.5 X |
| 2,757,290 | 7/1956 | Jacobs et al. | 250—43.5 |
| 2,767,320 | 10/1956 | Coggeshall | 23—230 X |

OTHER REFERENCES

Ellis: "Chemical Action of Ultraviolet Light," 1941, pp. 467 to 469.

Inoue: Chem. Abstr. 1953, vol. 47, p. 12048.

Snell: "Col. Meth. of Anal.," vol. III, pp. 104 to 108, 1953.

Stein et al.: Chem. Soc. J., 1949, pp. 3241 to 3263, the more specific pages are 3245–54.

MORRIS O. WOLK, *Primary Examiner.*

RALPH G. NILSON, MAURICE A. BRINDISI, A. R. BORCHELT, A. KIRON, *Examiners.*